(12) United States Patent
Yamada et al.

(10) Patent No.: US 10,964,348 B2
(45) Date of Patent: Mar. 30, 2021

(54) RECORDING CONTROL APPARATUS, RECORDING APPARATUS, RECORDING CONTROL METHOD, AND RECORDING CONTROL PROGRAM

(71) Applicant: JVCKENWOOD CORPORATION, Yokohama (JP)

(72) Inventors: Yasuo Yamada, Yokohama (JP); Toshitaka Murata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/743,778

(22) Filed: Jan. 15, 2020

(65) Prior Publication Data
US 2020/0176029 A1    Jun. 4, 2020

Related U.S. Application Data

(63) Continuation of application No. PCT/JP2018/037109, filed on Oct. 3, 2018.

(30) Foreign Application Priority Data

Dec. 27, 2017    (JP) .............................. JP2017-251094

(51) Int. Cl.
*G11B 27/034*    (2006.01)
*G11B 20/10*    (2006.01)
*G06K 9/00*    (2006.01)

(52) U.S. Cl.
CPC .... *G11B 20/10527* (2013.01); *G06K 9/00711* (2013.01); *G06K 9/00791* (2013.01); *G06K 2009/00738* (2013.01); *G11B 2020/10537* (2013.01); *G11B 2020/10898* (2013.01)

(58) Field of Classification Search
None
See application file for complete search history.

(56) References Cited

U.S. PATENT DOCUMENTS

2010/0157061 A1*  6/2010  Katsman .............. G07C 5/0866
                                                              348/149
2013/0218460 A1*  8/2013  Kim ................... G08G 1/09626
                                                              701/461
2017/0210323 A1*  7/2017  Cordova .............. G08G 1/0141

FOREIGN PATENT DOCUMENTS

JP      2012159897 A    8/2012
JP      2016009202 A    1/2016

* cited by examiner

*Primary Examiner* — Eileen M Adams
(74) *Attorney, Agent, or Firm* — Procopio, Cory, Hargreaves & Savitch LLP

(57) ABSTRACT

A recording control apparatus includes a video data acquisition unit configured to acquire video data obtained by shooting an area around a vehicle, an event detection unit configured to detect an occurrence of a predetermined event in the vehicle, a changing-point determination unit configured to determine whether or not the vehicle has passed a changing point on a traveling road based on a current position information of the vehicle, and a recording control unit configured to, when the event detection unit detects the occurrence of the event, record the video data including a first period as an event recording file in a recording unit, the first period being from a passing time point of the changing point to a detecting time point of the event, the changing point being a point that the vehicle has passed at least a first time earlier than the detecting time point of the event.

9 Claims, 13 Drawing Sheets

RECORDING CONTROL APPARATUS, RECORDING APPARATUS, RECORDING CONTROL METHOD, AND RECORDING CONTROL PROGRAM

CROSS REFERENCE TO RELATED APPLICATION

This application is based upon and claims the benefit of priority from Japanese patent application No. 2017-251094, filed on Dec. 27, 2017, and is a Continuation of International application No. PCT/JP2018/037109 filed on Oct. 3, 2018, the disclosure of which are incorporated herein in its entirety by reference.

BACKGROUND

The present disclosure relates to a recording control apparatus, a recording apparatus, a recording control method, and a recording control program.

A dashboard camera that records information about driving of a vehicle records video images and sounds inside and outside the vehicle obtained by a camera(s) installed in the vehicle together with a position, a speed, a traveling distance, etc. of the vehicle. The purposes of recording of information by the dashboard camera include managing safe driving of the vehicle, alerting a driver, and storing video images taken before and after an accident as evidence. For example, the dashboard camera generates a video file every minute and stores it in a recording medium. Then, when the number of stored files reaches the upper limit of the capacity of the recording medium, the oldest file(s) is overwritten.

Japanese Unexamined Patent Application Publication No. 2016-009202 proposes a dashboard camera including means for storing video images based on information input from an acceleration sensor and/or a voice input device. Further, the dashboard camera described in Japanese Unexamined Patent Application Publication No. 2016-009202 records video images and sounds for a constant time which starts at a time point that goes back a preceding storage time from a certain time point. By recording video images and sound from the time point that goes back a predetermined period as described above, the dashboard camera records an event that has triggered an accident as well as the accident that has occurred after the event.

SUMMARY

However, in some cases, the period from when an event that triggers a traffic accident or the like starts to when the accident occurs becomes longer due to the traveling road through which the vehicle has passed. Therefore, in the case in which recording is started from a time point that goes back a certain period from a time point at which an accident occurs, there is a possibility that an event that has triggered the accident may have started before the predetermined recording start time.

A recording control apparatus according to an aspect of an embodiment includes: a video data acquisition unit configured to acquire video data obtained by shooting an area around a vehicle; an event detection unit configured to detect an occurrence of a predetermined event in the vehicle; a changing-point determination unit configured to determine whether or not the vehicle has passed a changing point on a traveling road based on a current position information of the vehicle; and a recording control unit configured to, when the event detection unit detects the occurrence of the event, record the video data including a first period as an event recording file in a recording unit, the first period being from a passing time point of the changing point to a detecting time point of the event, the changing point being a point that the vehicle has passed at least a first time earlier than the detecting time point of the event.

A recording apparatus according to an aspect of an embodiment includes: a camera configured to shoot an area around a vehicle; a video data acquisition unit configured to acquire video data obtained by the camera; a recording unit configured to record the video data for each predetermined recording range; an event detection unit configured to detect an occurrence of a predetermined event in the vehicle; a changing-point determination unit configured to determine whether or not the vehicle has passed a changing point on a traveling road based on a current position information of the vehicle; and a recording control unit configured to, when the event detection unit detects the occurrence of the event, record the video data including a first period as an event recording file in the recording unit, the first period being from a passing time point of the changing point to a detecting time point of the event, the changing point being a point that the vehicle has passed at least a first time earlier than the detecting time point of the event.

A recording control method according to an aspect of an embodiment includes: a step of acquiring video data obtained by shooting an area around a vehicle; a step of detecting an occurrence of a predetermined event in the vehicle; a step of determining whether or not the vehicle has passed a changing point on a traveling road based on a current position information of the vehicle; and a step of, when the occurrence of the event is detected, recording the video data including a first period as an event recording file in a recording unit, the first period being from a passing time point of the changing point to a detecting time point of the event, the changing point being a point that the vehicle has passed at least a first time earlier than the detecting time point of the event.

A non-transitory computer readable medium storing a recording control program according to an aspect of an embodiment causes a computer to perform: a step of acquiring video data obtained by shooting an area around a vehicle; a step of detecting an occurrence of a predetermined event in the vehicle; a step of determining whether or not the vehicle has passed a changing point on a traveling road based on a current position information of the vehicle; and a step of, when the occurrence of the event is detected, recording the video data including a first period as an event recording file in a recording unit, the first period being from a passing time point of the changing point to a detecting time point of the event, the changing point being a point that the vehicle has passed at least a first time earlier than the detecting time point of the event.

DETAILED DESCRIPTION

Specific embodiments according to the present disclosure are explained hereinafter in detail with reference to the drawings. The same symbols are assigned to the same components throughout the drawings, and their duplicated explanations are omitted as appropriate.

First Embodiment

Figure 1:
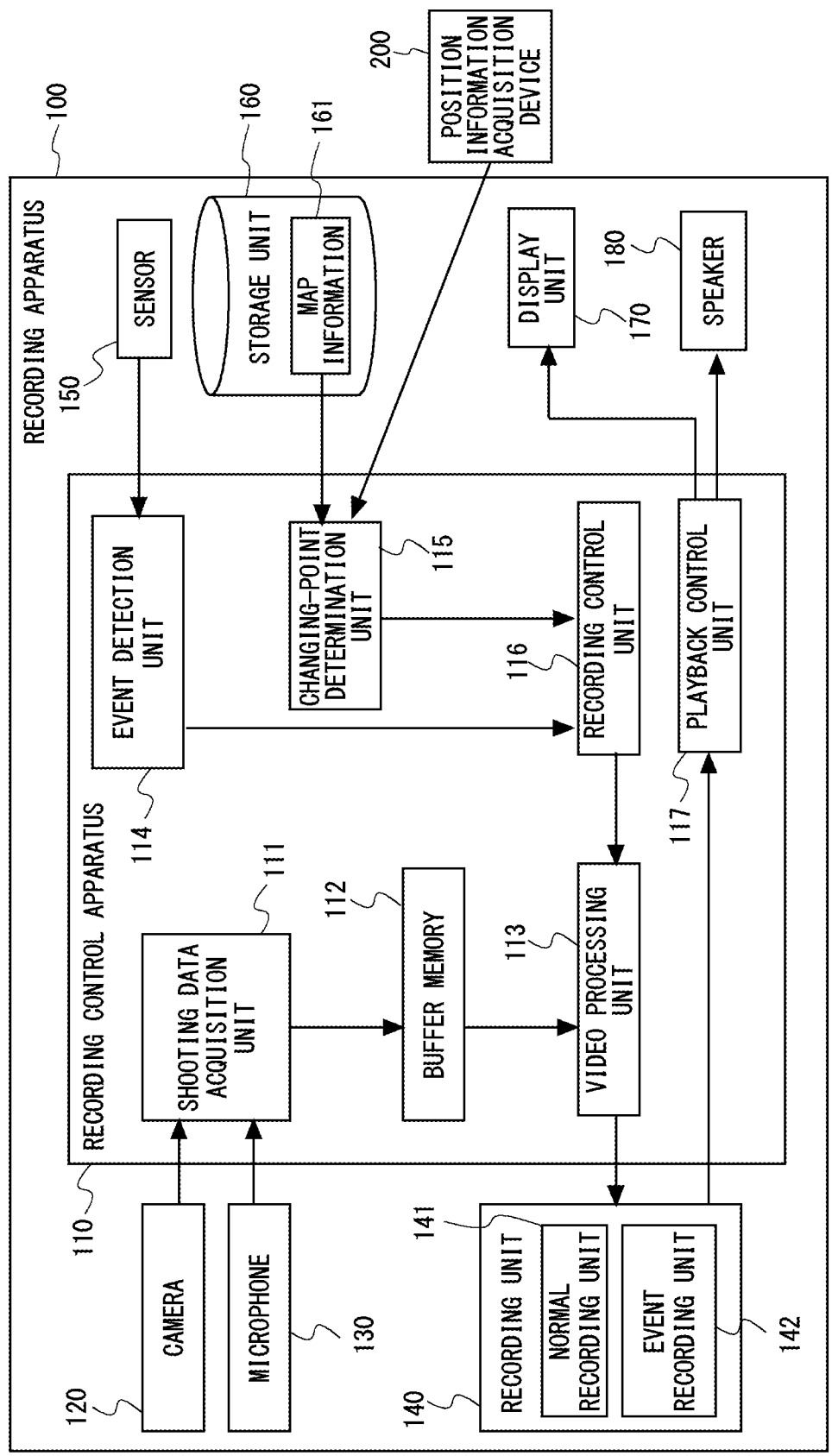
FIG. 1 is a block diagram showing an overall configuration of a recording apparatus including a recording control apparatus according to a first embodiment.

FIG. 1 is a block diagram showing an overall configuration of a recording apparatus 100 including a recording control apparatus 110 according to a first embodiment. The recording apparatus 100 is used, for example, as a dashboard camera installed in a vehicle. The recording apparatus 100 can be implemented as various types of apparatuses such as a computer apparatus that operates by having a processor execute a program stored in a memory. The recording apparatus 100 is, for example, a recording apparatus capable of implementing functions of this embodiment, such as a dashboard camera that can be retrofitted to a vehicle or a portable dashboard camera, or a recording apparatus that can be implemented as a standalone apparatus pre-installed in a vehicle or as functions of other apparatuses. The processor is, for example, a microprocessor, an MPU (Micro Processing Unit), or a CPU (Central Processing Unit). The memory may be a volatile memory or a nonvolatile memory, or may be formed by a combination of a volatile memory and a nonvolatile memory. The processor executes one or a plurality of programs including instructions for causing a computer to perform processes that will be described below with reference to the accompanying drawings.

The recording apparatus 100 includes a recording control apparatus 110, a camera 120, a microphone 130, a recording unit 140, a sensor 150, a storage unit 160, a display unit 170, and a speaker 180. The recording control apparatus 110 is connected to a position information acquisition device 200. The recording control apparatus 110, the camera 120, the microphone 130, the recording unit 140, the sensor 150, the storage unit 160, the display unit 170, the speaker 180, and the position information acquisition device 200 may be directly connected to each other by using certain cables or the like, or may be connected to each other through a CAN (Controller Area Network) which is an intra-vehicle network.

The position information acquisition device 200 is an external device that periodically acquires information about the current position of the recording apparatus 100 and outputs the acquired information to the recording control apparatus 110. The position information acquisition device 200 is, for example, an apparatus equipped with a function of acquiring GPS (Global Positioning System) information, and can acquire GPS information of the vehicle equipped with the recording apparatus 100 and the position information acquisition device 200. Note that the position information acquisition device 200 may use, for example, components/structures incorporated in a car navigation system provided in the vehicle.

The camera 120 generates video data obtained by shooting an area around the vehicle. For example, the camera 120 may be a single camera that shoots only a front view of the vehicle, or may consist of two cameras that shoot front and rear views of the vehicle. Further, the camera 120 may consist of two cameras that shoot the outside and inside of the vehicle. Further, the camera(s) that shoots the outside and inside of the vehicle may be an omnidirectional camera capable of shooting surroundings over 360 degrees.

The microphone 130 generates audio data by collecting sounds inside or outside the vehicle.

The recording unit 140 records a shooting file including at least video data. The shooting file may include audio data. The recording unit 140 is configured by, for example, hardware such as a hard disk drive, a solid state drive, and a card-type memory. The recording unit 140 includes a normal recording unit 141 and an event recording unit 142. The normal recording unit 141 and the event recording unit 142 may be configured as memory areas having different addresses in the recording unit 140, or may be constructed as different hardware components. Further, virtual addresses or flags based on information written in headers or payloads of shooting data recorded in the recording unit 140 may be referred to as the normal recording unit 141 and the event recording unit 142. Further, the recording unit 140 may be an external recording apparatus to which shooting data is transmitted by a communication function (not shown).

The sensor 150 is, for example, an acceleration sensor and detects a change in speed, i.e., an acceleration in a longitudinal direction, a horizontal direction, or a vertical direction of the vehicle. That is, the sensor 150 detects an acceleration caused by an impact or the like that occurs when the vehicle equipped with the recording apparatus 100 causes an accident or gets caught in an accident. Further, the sensor 150 may detect a speed of the vehicle. Further, the sensor 150 outputs, for example, a notification signal for sending detected information or an event detection signal indicating that the detected information indicates an occurrence of a predetermined event to the recording control apparatus 110.

The storage unit 160 is a storage device similar to the recording unit 140. Note that the storage unit 160 may be incorporated into the recording control apparatus 110. The storage unit 160 stores at least map information 161. The map information 161 includes map information corresponding to a traveling road on which the vehicle equipped with the recording apparatus 100 travels. Further, the map information 161 includes information in which positions of changing points on the traveling road are defined in advance. Note that examples of the changing point on the traveling road include an intersection at which a plurality of roads intersect each other, a point where a traffic signal is installed, i.e., a point where the vehicle ought to temporarily stop, a point where there is no traffic signal but the vehicle ought to temporarily stop, a T-junction point such as a merging point with other roads or a branching point into two or more roads. However, the changing point is not limited these examples. The map information 161 is read by the recording control apparatus 110 and supplied to a later-described changing-point determination unit 115.

The display unit 170 is a display for playing back the video data recorded in the recording unit 140. The speaker 180 plays back the audio data recorded in the recording unit 140. The speaker 180 includes an audio amplification unit and an audio processing unit (not shown). Even when it is referred to as the speaker 180, it includes these units.

Next, a configuration example of the recording control unit 110 is described. The recording control apparatus 110 includes a shooting data acquisition unit 111, a buffer memory 112, a video processing unit 113, an event detection unit 114, a changing-point determination unit 115, a recording control unit 116, and a playback control unit 117. Each of the components constituting the recording control apparatus 110 is, for example, software stored in a memory. Further, each of the components constituting the recording control apparatus 110 may be hardware such as a circuit and a semiconductor chip. Further, each of the components constituting the recording control apparatus 110 may be a combination of software and hardware.

The shooting data acquisition unit 111 acquires video data generated in the camera 120 and audio data generated in the microphone 130. Data including video data and audio data may be referred to as shooting data. It can be said that the shooting data acquisition unit 111 includes a video data acquisition unit and an audio data acquisition unit. In this case, it can be said that the video data acquisition unit acquires video data obtained by the camera 120. Further, the shooting data acquisition unit 111 acquires shooting data from the camera 120 and the microphone 130. The video data is generated by using, for example, a method such as H.264 or H.265. Further, the audio data may be generated by using, for example, a PCM (Pulse Code Modulation) method. Further, the shooting data which is moving image data including video data and audio data may be generated by using MPEG (Moving Picture Experts Group) 2-TS (Transport Stream) or AVI (Audio Video Interleave). The shooting data acquisition unit 111 outputs the shooting data including the video data and the audio data to the buffer memory 112.

The buffer memory 112 temporarily stores the shooting data output from the shooting data acquisition unit 111. The buffer memory 112 may be referred to as an internal memory disposed inside the recording control apparatus 110. The expression "temporarily storing" may mean, for example, that the buffer memory 112 deletes shooting data after a predetermined period has passed. Alternatively, the "temporarily storing" may mean overwriting data stored in the buffer memory 112 with data output from the shooting data acquisition unit 111 and thereby storing that data in the buffer memory 112. Alternatively, the "temporarily storing" may mean that after the buffer memory 112 outputs shooting data output from the shooting data acquisition unit 111 to the video processing unit 113, the buffer memory 112 deletes the shooting data stored therein. The buffer memory 112 outputs the temporarily-stored shooting data to the video processing unit 113.

The video processing unit 113 receives an instruction from the recording control unit 116, generates a shooting file by processing the shooting data output from the buffer memory 112, and outputs the generated shooting data to the recording unit 140. That is, for example, the video processing unit 113 may process the shooting data output from the buffer memory 112 and generate a shooting file of a predetermined time. Further, the video processing unit 113 may process the shooting data output from the buffer memory 112 and generate a shooting file of a predetermined angle of view. Further, the video processing unit 113 may process the shooting data output from the buffer memory 112, generates shooting data of a predetermined time or a predetermined angle of view, and generate a shooting file by adding, for example, header information such as a file name to the generated shooting data. Further, the video processing unit 113 may process the shooting data output from the buffer memory 112, perform a noise reduction and/or a distortion correction for the shooting data, and generate shooting data by adding an indication of time information, vehicle speed information, vehicle position information or the like in the original shooting data.

The event detection unit 114 detects an occurrence of an event by using information output from the sensor 150. For example, when an impact level detected by the sensor 150, which operates as an acceleration sensor, exceeds a predetermined value, the event detection unit 114 detects that an event such as sudden braking, unsafe driving, or a traffic accident has occurred. The expression "an impact level exceeding a predetermined value" may be rephrased as "an acceleration exceeding a predetermined value". That is, the event detection unit 114 detects an occurrence of a predetermined event in the vehicle. Then, when the event detection unit 114 detects an occurrence of an event, it outputs an event detection signal, which is information indicating that the event has occurred, to the recording control unit 116. The information indicating that the event has occurred may include a time at which the event occurred, i.e., an event detection time that is a time at which the occurrence of the event is detected. Note that the event detection time can be regarded as information for specifying the detecting time point of the event. Further, the information indicating that the event has occurred may include, for example, an acceleration value from a time point that goes back a predetermined period from the time at which the event occurred to the time at which the event occurred. Note that when the event detection unit 114 receives the above-described event detection signal from the sensor 150, the event detection unit 114 may detect that an event has occurred according to the event detection signal.

The change-point decision unit 115 determines whether or not the vehicle has passed a changing point on the traveling road based on current position information of the vehicle. Specifically, the changing-point determination unit 115 compares current position information of the recording apparatus 100 output from the position information acquisition device 200 with the map information 161, and determines whether or not the current position information corresponds to a position of a changing point on the traveling road defined in the map information 161. Then, after determining that the current position information corresponds to the position of the changing point, when the changing-point determination unit 115 determines that subsequently-acquired current position information has deviated from the position of the changing point on the traveling road, it determines that the vehicle equipped with the apparatus 100 has passed the changing point on the traveling load. Then, the changing-point determination unit 115 outputs a changing-point passage determination signal indicating a result of the determination as to whether or not the vehicle has passed the changing point on the traveling road to the recording control unit 116.

In response to the event detection signal from the event detection unit 114 and the changing-point passage determination signal from the changing-point determination unit 115, the recording control unit 116 sends an instruction to the image processing unit 113 and thereby instructs the video processing unit 113 to generate a shooting file by processing at least a part of the range of the shooting data stored in the buffer memory 112. Then, the recording control unit 116 sends an instruction to the video processing unit 113 and thereby instructs the video processing unit 113 to output the generated shooting file to the recording unit 140.

Regarding the shooting file to be generated, there are two types of files, i.e., a normal recording file and an event recording file. The normal recording file is a shooting file that is generated while no occurrence of an event is detected by the event detection unit 114. Note that the normal recording file is a file that is generated by converting shooting data of a period no shorter than a minimum time Tmin and no longer than a maximum time Tmax into a file. For example, the normal recording file is a shooting file that is generated for shooting data of a period between two changing points that the vehicle has passed while no occurrence of an event is detected. Further, the normal recording file is generated every time the vehicle passes a changing point while no occurrence of an event is detected. Further, the normal recording file is a shooting file that is generated for shooting data of each period of the minimum time Tmin from the previous file separating point when no occurrence of an event is detected and the changing-point determination unit 115 determines that the vehicle has not passed a changing point at least for the maximum time Tmax.

Meanwhile, the event recording file is obtained by, when an occurrence of an event is detected by the event detection unit 114, converting shooting data for a first period, which is a predetermined period before the event detecting time point, and for a second period, which is a predetermined period after the event detecting time point, into the file. Note that the first period is a period at least equal to or longer than the minimum time Tmin.

Accordingly, in response to the event detection signal and the changing-point passage determination signal, the recording control unit 116 makes the video processing unit 113 generate the normal recording file or the event recording file. Then, the recording control unit 116 sends an instruction to the video processing unit 113 and thereby instructs it to output the generated normal recording file to the normal recording unit 141. Further, the recording control unit 116 sends an instruction to the video processing unit 113 and thereby instructs it to output the generated event recording file to the event recording unit 142. The recording control unit 116 may output, for example, information about a file name, a file type, etc. as header information for generating the shooting file to the video processing unit 113. Further, the recording control unit 116 may determine a start time and an end time of the shooting file, and output them to the video processing unit 113.

Further, the recording control unit 116 may also be able to separately record the event recording file and the normal recording file in the recording unit 140. To separately record the event recording file and the normal recording file in the recording unit 140 may mean that the recording control unit 116 sets flag information or the like indicating that the file is an event recording file in the header or the payload of the event recording file. Further, the recording control unit 116 may set flag information or the like indicating that the file is a normal recording file in the header or the payload of the normal recording file, or may set no flag information in the header or the payload thereof. That is, shooting data in which no flag information is set may be recognized as a normal recording file. Conversely, when flag information indicating that the file is a normal recording file is set in the header or payload of the normal recording file, no flag information may be set in the event recording file.

Further, the recording control unit 116 may record the event recording file as write-protected data in the recording unit 140. For example, the recording control unit 116 may record the event recording file in the recording unit 140 while designating an address of a memory area in the recording unit 140 in which overwriting of data is prohibited. Alternatively, the recording control unit 116 may set flag information or the like indicating that overwriting is prohibited in the header or the payload of the event recording file. The addresses of the memory area in the recording unit 140 in which overwriting of data is prohibited may be the same as those of the memory area in the recording unit 140 in which the event recording file is recorded. Further, one of these memory areas may be included in the other of them.

Further, the recording control unit 116 may record the normal recording file as write-permitted data in the recording section 140. For example, the recording control unit 116 may record the normal recording file in the recording unit 140 while designating an address of a memory area in the recording unit 140 in which overwriting of data is permitted. Alternatively, the recording control unit 116 may set flag information or the like indicating that overwriting is permitted in the header or the payload of the normal recording file. The addresses of the memory area in the recording unit 140 in which overwriting of data is permitted may be the same as those of the memory area in the recording unit 140 in which the normal recording file is recorded. Further, one of these memory areas may be included in the other of them. Further, the recording control unit 116 may record the normal recording file as write-permitted data in the recording unit 140 and transmit the event recording data to an external recording apparatus by using a communication function (not shown).

Further, it is considered that when the event detection unit 114 detects an occurrence of an event, the recording control unit 116 determines a passing time point of a changing point, which the vehicle has passed at least a first time (e.g., the minimum time Tmin) earlier than the detecting time point of the event, as a start time, determines the detecting time point of the event as an end time, determines a period from the start time to the end time as a first period, and records video data including the determined first period as write-protected data in the recording unit 140. In this way, when video data at the time of an occurrence of an event is recoded, it is possible to include video data that starts at a passing time point of a changing point that the vehicle has passed at least a fixed period before the detecting time point of the event in the event recording file, rather than recording a fixed period before the detecting time point of the event. That is, when an event occurs within a relatively short time from the passage of an intersection, there is a high possibility that the event could be caused by the passage of the intersection or its nearby area. Therefore, the passage of the intersection and its nearby area is included in the event recording file. On the other hand, when it is at least some length of time before an occurrence of an event and before the passage of an intersection or the like, there is a high possibility that an event that caused the occurrence of the event is not included in the event recording file. Therefore, in this embodiment, a time point that is at least some length of time before an occurrence of an event and after the passage of an intersection or the like is defined as a start time and a period from the start time to the occurrence of the event is defined as a first period. Further, at least the first period is included in the event recording file. Therefore, it is possible to appropriately record an event that has triggered a traffic accident or the like.

In particular, the recording control unit 116 preferably defines a passing time point of a changing point as a start time of the first period, the changing point being a point that the vehicle has last passed among changing points that the vehicle has passed at least the first time earlier than the detecting time point of the event. In many cases, the vehicle passes a plurality of changing points while traveling. Therefore, it is considered that under a precondition that passages of a plurality of changing points are at least some length of time before an occurrence of an event, relevance between a changing point that the vehicle has passed most recently among the plurality of changing points and the occurrence of the event is high. Therefore, it is possible to reduce the size of the event recording file while maintaining a high possibility that an event that caused an occurrence of an event is included in the event recording file.

Further, when the first period is at least a second time (e.g., the maximum time Tmax), which is longer than the first time, earlier than a detecting time point of an event, the recording control unit 116 defines a time point that goes back a time no shorter than the first time and shorter than the second time from the event detecting time point as a start time of the first period. In this way, it is possible to reduce the size of the event recording file to an appropriate size.

Further, when the event detection unit 114 detects an occurrence of an event, the recording control unit 116 preferably determines a period from an event detecting time point until a predetermined time elapses as a second period, and records video data including the second period in addition to the first period as write-protected data in the recording unit 140. In this way, it is possible to include a situation immediately after an occurrence of an accident or the like in the event recording file and thereby improve the accuracy of an analysis of the cause of the accident.

Further, every time the vehicle passes a changing point, the recording control unit 116 determines a boundary time, which is used as a boundary of video data, so that the recording range of the video data becomes equal to or longer than the first time. Then, when no occurrence of an event is detected within a third time (e.g., the maximum time Tmax), which is longer than the first time, the recording control unit 116 preferably records video data between the last two consecutive boundary times as a write-permitted file in the recording unit 140. In this way, it is possible to generate a normal recording file whose separation points are defined by passages of changing points. Then, when an event is detected, it is possible to easily select a start time of the first period from boundary times that are at least the first time earlier than the detecting time point of the event and thereby determine an appropriate first period.

The playback control unit 117 acquires shooting data recorded in the recording unit 140, outputs video data based on the acquired shooting data to the display unit 170, and outputs audio data based on the acquired shooting data to the speaker 180 or the like. When the playback control unit 117 receives playback instruction information for a shooting file entered by a user operating the recording apparatus 100, the playback control unit 117 acquires the shooting file that the user wants to play back from the memory area in the recording unit 140.

Figure 2:
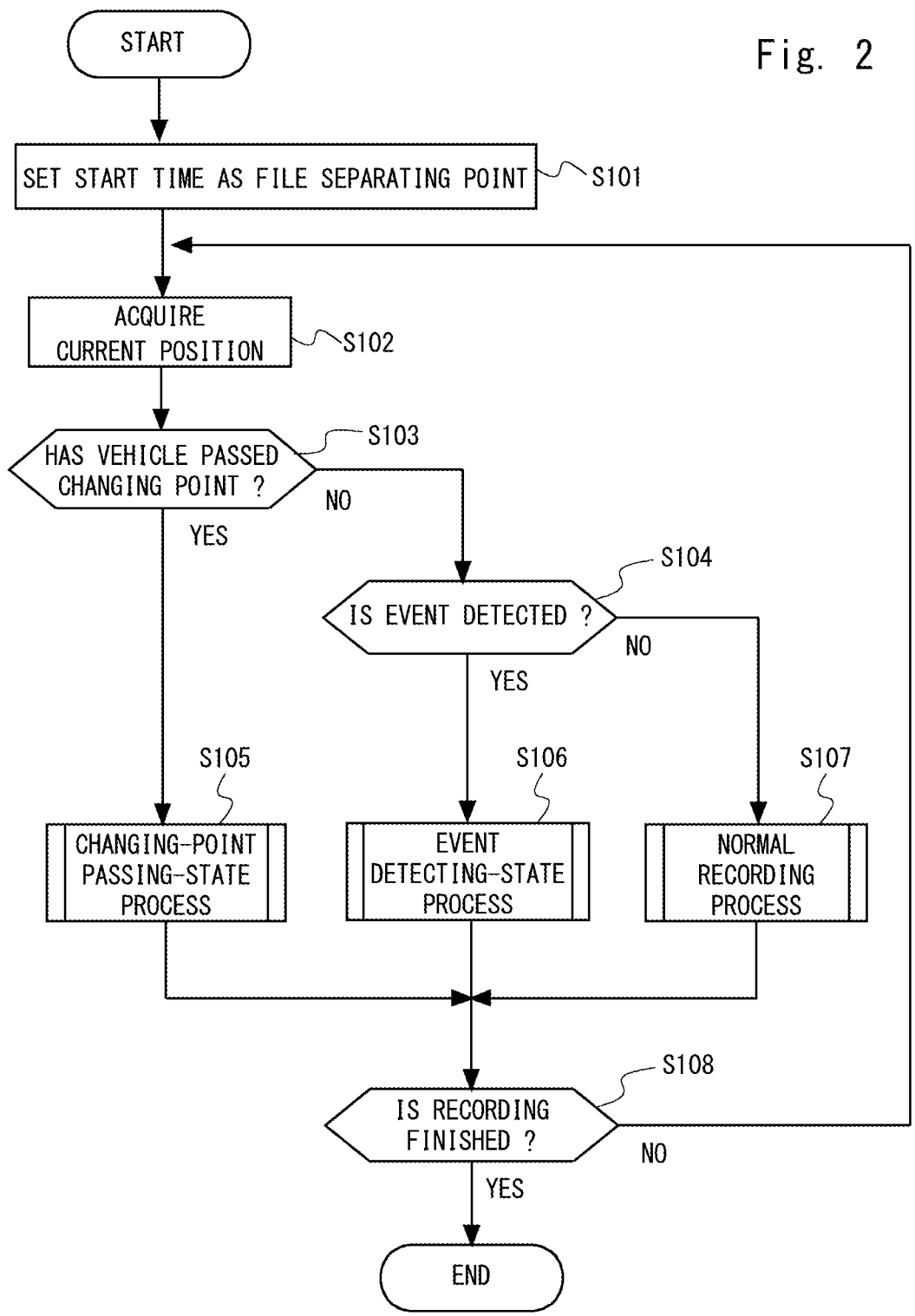
FIG. 2 is a flowchart showing a flow of a recording control process according to the first embodiment.

Next, a flow of a recording control process according to the first embodiment is described with reference to a flow-chart shown in FIG. 2. Note that in the following description, the term "file separating point" indicates a start time or an end time of a recording range in a shooting file. That is, the file separating point can be considered to be an example of the above-described boundary time. Note that the file separating point is not limited to time information, but may be a pointer or the like that specifies an image frame in video data. Further, it is assumed that in the memory in the recording apparatus 100, a storage area for holding a current file separating point value, a next file separating point value, at least one file separating point value in the past, an elapsed time TA, an elapsed time TB, a start time and an end time of a first period, and a start time and an end time of a second period is secured. Further, it is assumed that in the memory in the recording apparatus 100, the minimum time Tmin, the maximum time Tmax, and a set value of the second period are set in advance. For example, it is assumed that: the minimum time Tmin is 60 seconds; the maximum time Tmax is 120 seconds; and the second period is 60 seconds. However, they are not limited these examples.

Firstly, at the start of the recording control process, the recording control unit 110 sets a start time as the current file separating point (S101). For example, the recording control apparatus 110 acquires the current time from a timer or the like installed therein and stores the acquired current time as the current file separating point in the memory of the recording apparatus 100. Note that the start time of the recording control process is, for example, a time at which the recording apparatus 100 is powered on or a time at which the recording apparatus 100 is instructed to start the recording control process by an operation or the like performed by a user. Further, it is assumed that at the start time of the recording control process, at least the camera 120 and the microphone 130 are already in operation.

The recording control unit 110 acquires current position information of the vehicle from the position information acquisition device 200 (S102). Specifically, the changing-point determination unit 115 in the recording control apparatus 110 receives current position information output from the position information acquisition device 200. Further, the changing-point determination unit 115 refers to the map information 161.

Next, the changing-point determination unit 115 determines whether or not the vehicle has passed a changing point based on the current position information and the map information 161. Then, the changing-point determination unit 115 outputs a changing-point passage determination signal to the recording control unit 116. Further, the event detection unit 114 detects an occurrence of an event based on information output from the sensor 150 and outputs, when the occurrence of the event is detected, an event detection signal to the recording control unit 116.

Note that when the changing-point passage determination signal indicates that the vehicle has passed a changing point (Yes at S103) and no event detection signal is output, the recording control unit 116 performs a changing-point passing-state process (S105). Details of the changing-point passing-state process will be described later with reference to FIG. 4.

Further, when the changing-point passage determination signal indicates that the vehicle has not passed a changing point (No at S103) and an event detection signal is output (Yes at S104), the recording control unit 116 performs an event detecting-state process (S106). Details of the event detecting-state process will be described later with reference to FIG. 5.

Further, when the changing-point passage determination signal indicates that the vehicle has not passed a changing point (No at S103) and no event detection signal is output (No at S104), the recording control unit 116 performs a normal recording process (S107). Details of the normal recording process will be described later with reference to FIG. 3.

After the step S105, S106 or S107, the recording controller 110 determines whether or not to finish the recording (S108). For example, when the recording apparatus 100 is powered off or when the recording apparatus 100 is instructed to finish the recording control process by an operation or the like performed by a user, the recording control apparatus 110 finishes the recording (Yes at S108). On the other hand, when the recording is not finished (No at S108), the process returns to the step S102 after a predetermined time has elapsed.

Figure 3:
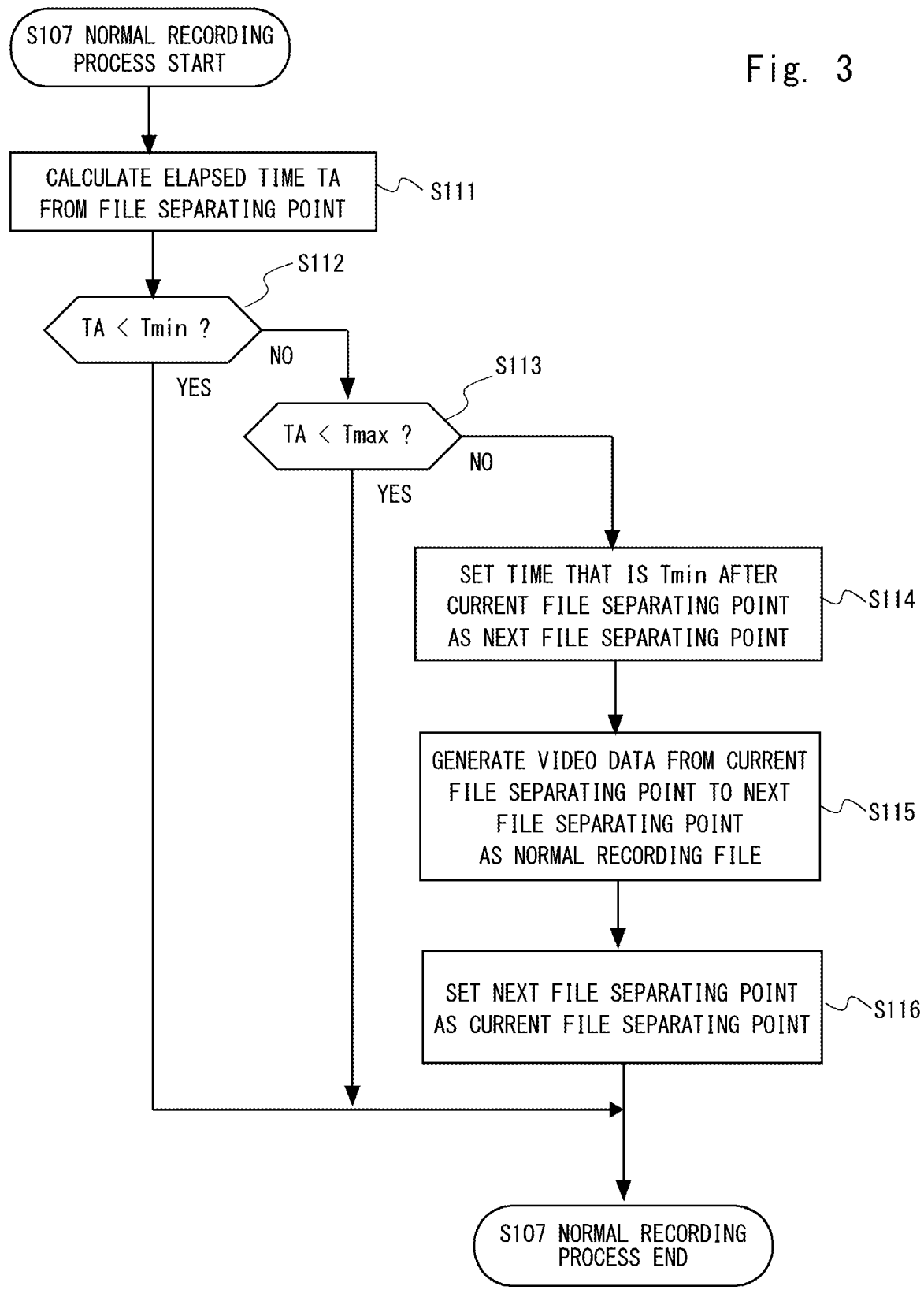
FIG. 3 is a flowchart showing a flow of a normal recording process in the recording control process according to the first embodiment.
Figure 6:
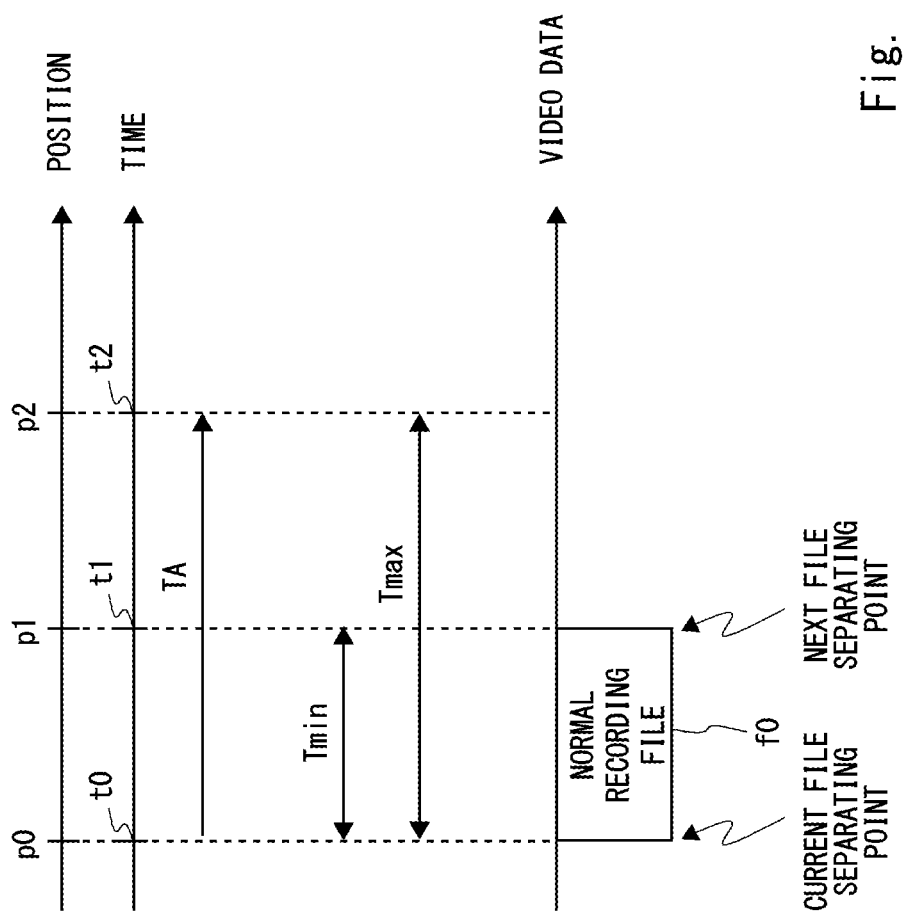
FIG. 6 shows a relation among a position, a time, and a file when generating a normal recording file according to the first embodiment.

FIG. 3 is a flowchart showing a flow of a normal recording process (S107) in the recording control process according to the first embodiment. Further, the normal recording process is described in a concrete manner by using an example shown in FIG. 6 as required. FIG. 6 shows a relation among a position, a time, and a file when generating a normal recording file according to the first embodiment.

In FIG. 6, points on the traveling road that the vehicle passes as it travels are indicated as points p0, p1 and p2 in the passing order. It is assumed that the points p0 to p2 are not changing points on the traveling road such as intersections. Further, times that are acquired when the vehicle passes respective points are indicated as times t0, t1 and t2. Note that each of the times t0 to t2 also corresponds to a shooting time of image data of one frame in video data shot by the camera 120 when the vehicle passes the respective one of the points p0 to p2. That is, the times t0 to t2 are passing time points at which the vehicle passes the points p0 to p2 on the traveling road, and are information specifying image data in video data shot at the passing time points.

Further, here, it is assumed that the recording control process is started at the point p0 and the time t0 is set as the current file separating point in the step S101. After that, the normal recording process in the step S107 that is performed when the vehicle travels will be described. Firstly, the recording control unit 116 calculates an elapsed time TA from the current file separating point (S111). For example, the recording control unit 116 calculates the elapsed time TA by subtracting the boundary time set as the current file separating point from the current time. Then, the recording control unit 116 determines whether or not the elapsed time TA is shorter than the minimum time Tmin (S112). For example, when the vehicle has not reached the point p1, the elapsed time TA is shorter than the minimum time Tmin (Yes at S112). Therefore, the normal recording process is finished and the process proceeds to the step S108. On the other hand, when the vehicle has already passed the point p1, the elapsed time TA becomes equal to or longer than the minimum time Tmin (No at S112). Therefore, the recording control unit 116 determines whether or not the elapsed time TA is shorter than the maximum time Tmax (S113). In this process, when the vehicle has already passed the point p1 but has not reached the point p2, the elapsed time TA is shorter than the maximum time Tmax (Yes at S113). Therefore, the normal recording process is finished and the process proceeds to the step S108.

Further, when the vehicle reaches the point p2, the elapsed time TA is equal to the maximum time Tmax (No at S113). Therefore, the recording control unit 116 sets a time t1 that is the minimum time Tmin after the time T0, which is the current file separating point, as the next file separating point (S114). Then, the recording control unit 116 generates video data from the current file separating point to the next file separating point as a normal recording file (S115). Specifically, the recording control unit 116 determines the times t0 and t1 as a start time and an end time, respectively, sends an instruction in which the start time and the end time are defined as a recording range to the video processing unit 113, and thereby instructs the video processing unit 113 to generate one of video data stored in the buffer memory 112 that corresponds to the instructed recording range as a normal recording file f0. Then, the recording control unit 116 instructs the video processing unit 113 to record the normal recording file f0 in the normal recording unit 141. That is, the write-permitted normal recording file f0 is stored in the normal recording unit 141.

After that, the recording control unit 116 sets a value of the next file separating point as the current file separating point (S116). Specifically, firstly, as a preliminary process, the recording control unit 116 sets the time t0 set as the current file separating point in the memory as a value of a file separating point in the past. Note that when a plurality of past file separating points are held, it is set in an undefined area. Further, when values have already been set to all of a plurality of past file separating points, it is written over a value of a past file separating point to which an oldest time has been set. The above-described description applies to subsequent processes. Then, the recording control unit 116 sets the time t2 set as the next file separating point in the memory as a value of the current file separating point and clears the value of the next file separating point. After that, the normal recording process is finished and the process proceeds to the step S108.

Note that the determination process in the step S112 may be skipped. Alternatively, in the case of "No" at the step S112, the step S114 may be performed in advance only when the next file separating point has not been set. Further, in that case, the step S114 that is performed in the case of "No" at the step S113 becomes unnecessary.

Figure 4:
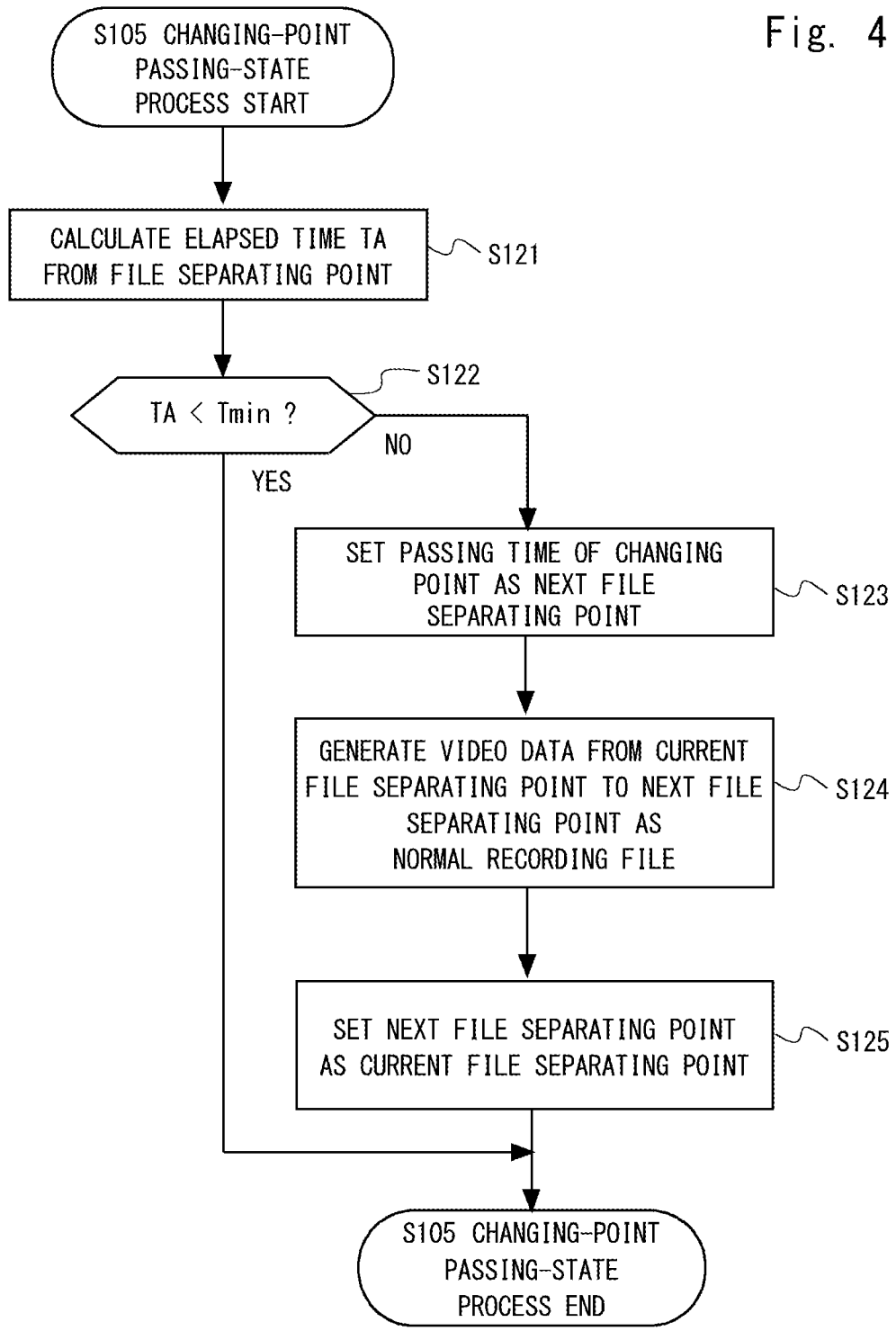
FIG. 4 is a flowchart showing a flow of a changing-point passing-state process in the recording control process according to the first embodiment.
Figure 7:
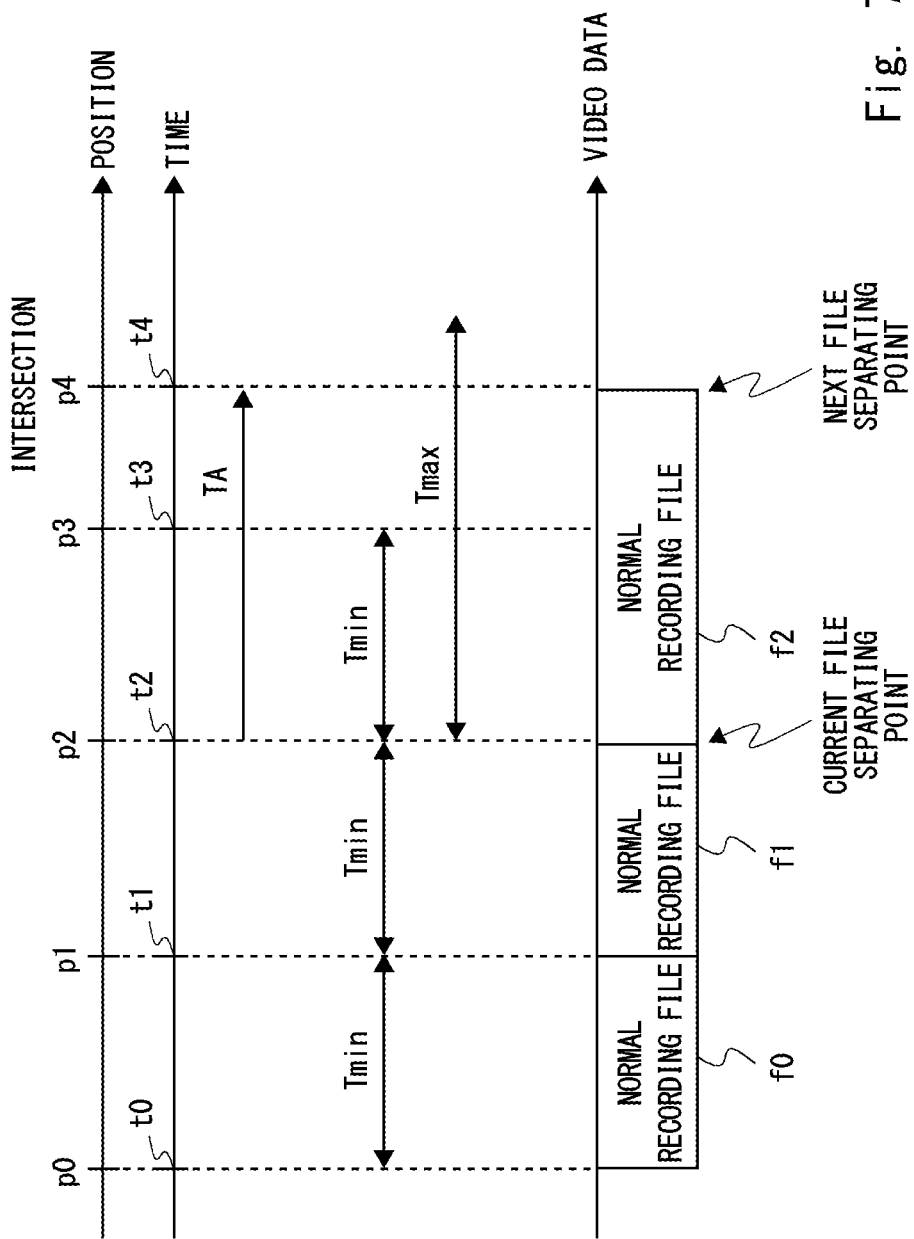
FIG. 7 shows a relation among a position, a time, and a file when generating a normal recording file at the time when a vehicle passes an intersection according to the first embodiment.

FIG. 4 is a flowchart showing a flow of a changing-point passing-state process in the recording control process according to the first embodiment. Further, the changing-point passing-state process is described in a concrete manner by using examples shown in FIG. 7 or 8 as required. FIG. 7 shows a relation among a position, a time, and a file when generating a normal recording file at the time when the vehicle passes an intersection according to the first embodiment.

FIG. 7 is an example that is performed subsequent to the above-described example shown in FIG. 6. For example, it shows that after the vehicle passed the point p2, the minimum time Tmin has elapsed and the vehicle reaches the point p3, where a normal recording file f1 is generated. After that, it is assumed that the vehicle has passed an intersection p4. At this point, the changing-point passing-state process in the step S105 is performed. Note that at this point, the time t2 is set as the current file separating point.

In the changing-point passing-state process, firstly, the recording control unit 116 calculates an elapsed time TA from the current file separating point (S121). Then, the recording control unit 116 determines whether or not the elapsed time TA is shorter than the minimum time Tmin (S122). When the elapsed time TA is shorter than the minimum time Tmin (Yes at S122), the changing-point passing-state process is finished and the process proceeds to the step S108. However, in this example, since the vehicle has already passed the intersection p4 and the current time is a time t4, the elapsed time TA is equal to or longer than the minimum time Tmin (No at S122). Therefore, the recording control unit 116 sets the time t4, which is the time of passing the intersection p4, i.e., a changing point, as the next file separating point (S123). Then, the recording control unit 116 generates video data from the current file separating point to the next file separating point as a normal recording file (S124). Specifically, the recording control unit 116 determines the times t2 and t4 as a start time and an end time, respectively, sends an instruction in which the start time and the end time are defined as a recording range to the video processing unit 113, and thereby instructs the video processing unit 113 to generate one of video data stored in the buffer memory 112 that corresponds to the instructed recording range as a normal recording file f2. Then, the recording control unit 116 instructs the video processing unit 113 to record the normal recording file f2 in the normal recording unit 141. That is, the write-permitted normal recording file f2 is stored in the normal recording unit 141. Note that the normal recording file f2 is an example in which the start time is a point other than the changing point and the end time is a changing point.

After that, the recording control unit 116 sets the value of the next file separating point as the current file separating point (S125). Specifically, firstly, as a preliminary process, the recording control unit 116 sets the time t2 set as the current file separating point in the memory as a value of a file separating point in the past. Then, the recording control unit 116 sets the time t4 set as the next file separating point in the memory as a value of the current file separating point and clears the value of the next file separating point. After that, the changing-point passing-state process is finished and the process proceeds to the step S108.

Note that in FIG. 7, the elapsed time TA in which the vehicle travels from the point p2 to the intersection p4 is shorter than the maximum time Tmax. As a supplementary explanation, an imaginary case where the intersection p4 is more distant and hence the elapsed time TA in which the vehicle passes the intersection p4 exceeds the maximum time Tmax is described here. In this case, at the moment when the vehicle has passed, after having passed the point p3, a position before the intersection p4 and the elapsed time TA exceeds the maximum time Tmax, a normal recording file between the times t2 and t3 is generated. As a result, the current file separating point is updated from the time t2 to the time t3. Therefore, after that, when the elapsed time TA is calculated at the moment when the vehicle passes the intersection p4, the time is also shorter than the maximum time Tmax. Therefore, the recording range of the normal recording file is no shorter than the minimum time Tmin and no longer than the maximum time Tmax. In this way, it is possible to limit the size of each normal recording file to a certain range and easily keep track of the recording even when no event occurs.

Figure 8:
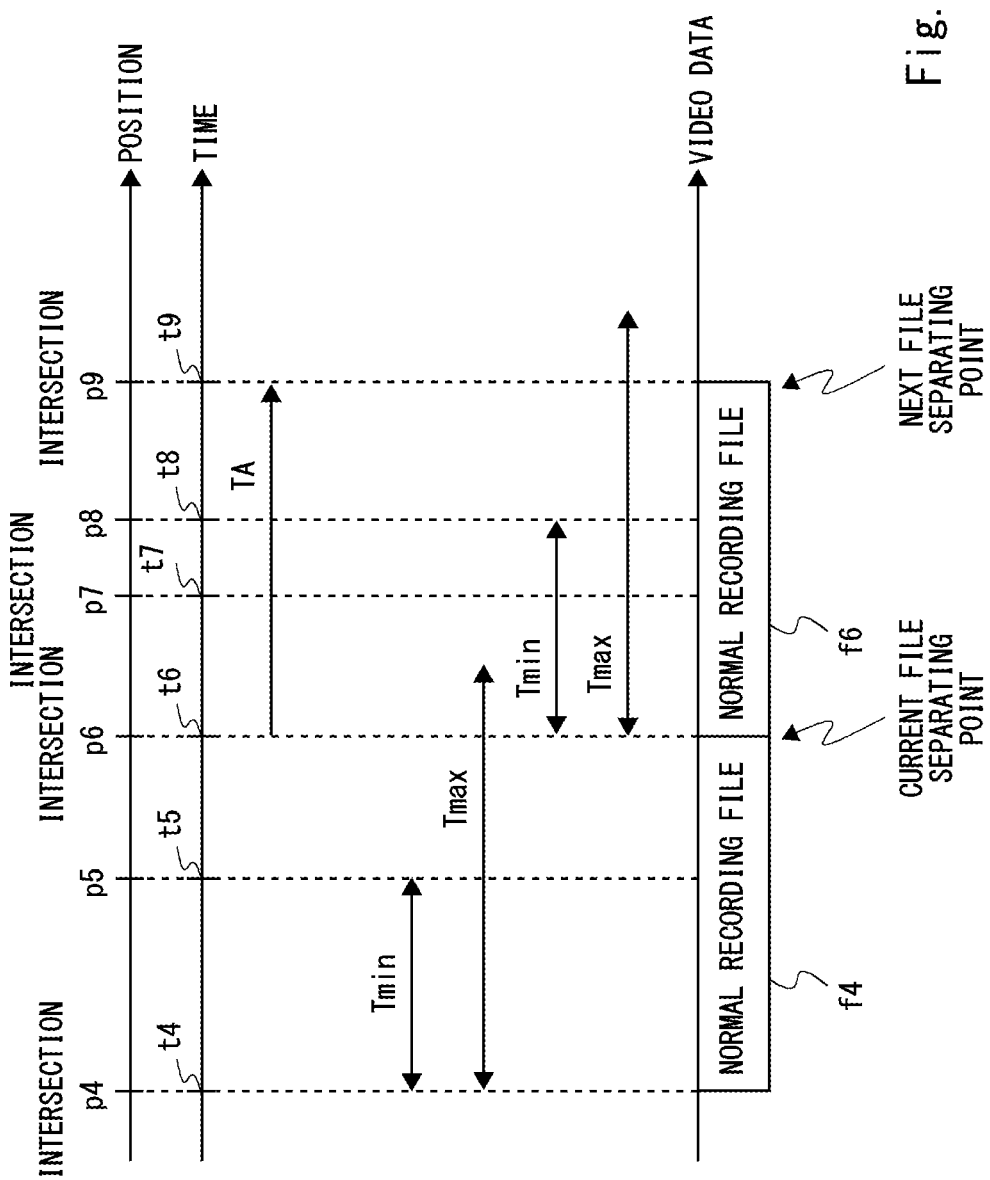
FIG. 8 shows a relation among a position, a time, and a file when generating a normal recording file between intersections according to the first embodiment.

Further, FIG. 8 shows a relation among a position, a time, and a file when generating a normal recording file between intersections according to the first embodiment. FIG. 8 is an example that is performed subsequent to the above-described example shown in FIG. 7. For example, after the vehicle passed the intersection p4, the minimum time Tmin has elapsed and the vehicle passes the point P5. In the normal recording process, the elapsed time TA from the time t4, which is the current file separating point, to the time t5 is no shorter than the minimum time Tmin and no longer than the maximum time Tmax. Therefore, "Yes" is selected in the step S113. Therefore, no normal recording file is generated in this stage. After that, the vehicle passes an intersection p6 and a changing-point passing-state process is performed, so that a normal recording file f4 is generated. After that, the vehicle passes an intersection p7 and a changing-point passing-state process is performed. However, since the elapsed time TA from the time t6 to the time t7 is shorter than the minimum time Tmin, "Yes" is selected in the step S122. Therefore, no normal recording file is generated in this stage. After that, the vehicle passes a point p8. However, similarly to the above-described passage of the point p5, no normal recording file is generated. After that, the vehicle passes an intersection p9 and a changing-point passing-state process is performed, so that a normal recording file f6 is generated. Note that the normal recording files f4 and f6 are examples in which the start time and the end time are changing points, that is, the recording range is between changing points.

Figure 5:
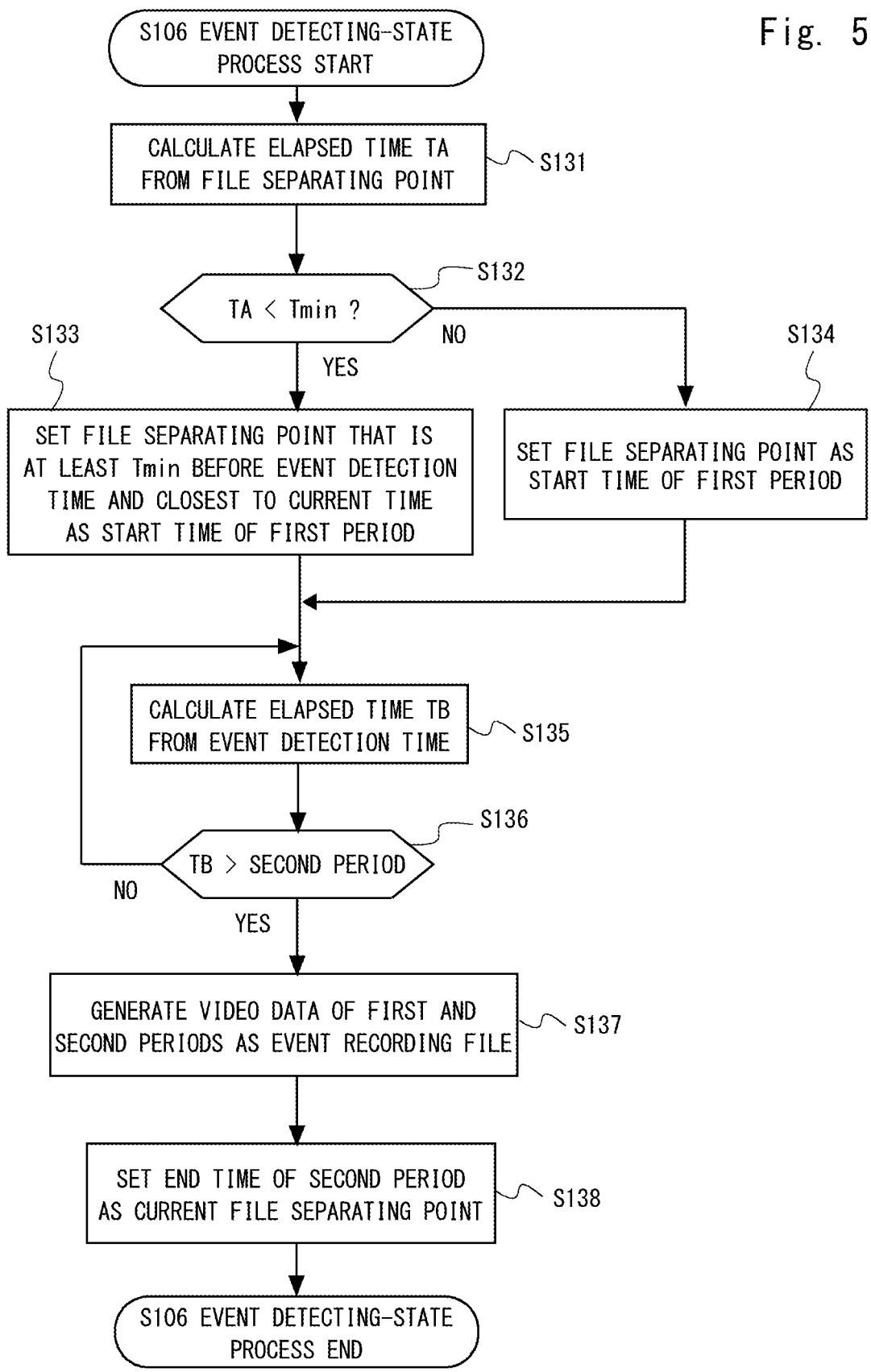
FIG. 5 is a flowchart showing a flow of an event detecting-state process in the recording control process according to the first embodiment.
Figure 9:
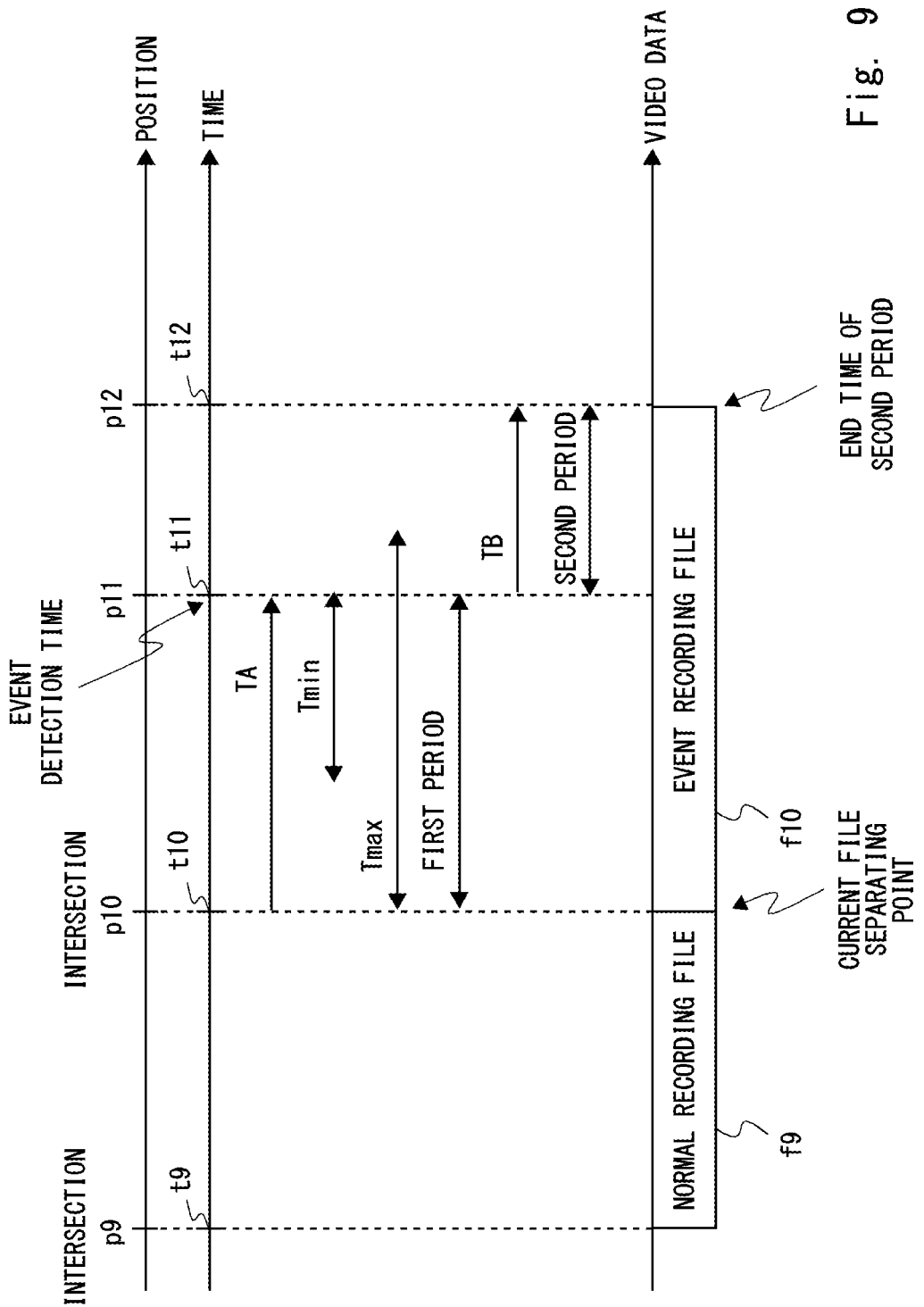
FIG. 9 shows a relation among a position, a time, and a file when generating an event file in which an intersection is a start time, according to the first embodiment.

FIG. 5 is a flowchart showing a flow of an event detecting-state process in the recording control process according to the first embodiment. Further, the event detecting-state process is described in a concrete manner by using examples shown in FIGS. 9 to 12 as required. FIG. 9 shows a relation among a position, a time, and a file when generating an event file in which an intersection is a start time, according to the first embodiment.

FIG. 9 is an example that is performed subsequent to the above-described example shown in FIG. 8. For example, FIG. 9 indicates that the vehicle passes an intersection p10 after passing an intersection p9, and a normal recording file f9 is generated. It is assumed that after that, when the vehicle reaches an event occurrence point p11, an event is detected. At this point, the event detecting-state process in the step S106 is performed. Note that at this point, a time t10 has already been set as the current file separating point.

In the event detecting-state process, firstly, the recording control unit 116 calculates an elapsed time TA from the current file separating point (S131). Then, the recording control unit 116 determines whether or not the elapsed time TA is shorter than the minimum time Tmin (S132). In the case of FIG. 9, since the elapsed time TA is a time from the time t10 to the event detection time t11, it is equal to or longer than the minimum time Tmin (No at S132). Therefore, the recording control unit 116 sets the time t10, which is the current file separating point, as a start time of a first period (S134). At the same time, the recording control unit 116 sets the event detection time t11 as a start time of a second period.

Then, the recording control unit 116 calculates an elapsed time TB from the event detection time (S135). The event detection time is included in the event detection signal as the current time when an occurrence of an event is detected in the sensor 150 or as the current time when an occurrence of an event is detected in the event detection unit 114. Alternatively, the event detection time may be the current time when the recording control unit 116 detects an event detection signal. Note that in the case of FIG. 9, the event detection time is the time t11.

After that, the recording control unit 116 determines whether or not the elapsed time TB has exceeded a predetermined set value of the second period (S136). When it is determined that the elapsed time TB has not exceeded the second period (No at S136), the recording control unit 116 performs the step S135 again after waiting a predetermined time. When it is determined that the elapsed time TB has exceeded the second period in the step S135 (Yes at S136), the recording control unit 116 sets the current time as an end time of the second period. For example, when the vehicle passes a point p12, it is determined that the elapsed time TB has exceeded the second period, so that a time t12 is set as the end time of the second period.

Then, the recording control unit 116 generates video data of the first and second periods as an event recording file (S137). Specifically, the recording control unit 116 determines the time t10, which is the start time of the first period, as a start time of a recording range and determines the time t12, which is the end time of the second period, as an end time of the recording range. Further, the recording control unit 116 gives an instruction in which the determined start time and the end time are defined as a recording range to the video processing unit 113 and thereby instructs the video processing unit 113 to generate one of video data stored in the buffer memory 112 that corresponds to the instructed recording range as a normal recording file f10. Then, the recording control unit 116 instructs the video processing unit 113 to record the event recording file f10 in the event recording unit 142. That is, the write-protected event recording file f10 is stored in the event recording unit 142. Note that the event recording file f10 is an example of an event recording file in which a start time is a changing point.

After that, the recording control unit 116 sets the end time of the second period as the current file separating point (S138). Specifically, firstly, as a preliminary process, the recording control unit 116 sets the time t10 set as the start time of the first period in the memory are a value of a file separating point in the past. Then, the recording control unit 116 sets the time t12 set as the ending tine of the second period in the memory as a value of the current file separating point and clears the start time and the end time of each of the first and second periods. After that, the event detecting-state process is finished and the process proceeds to the step S108.

Figure 10:
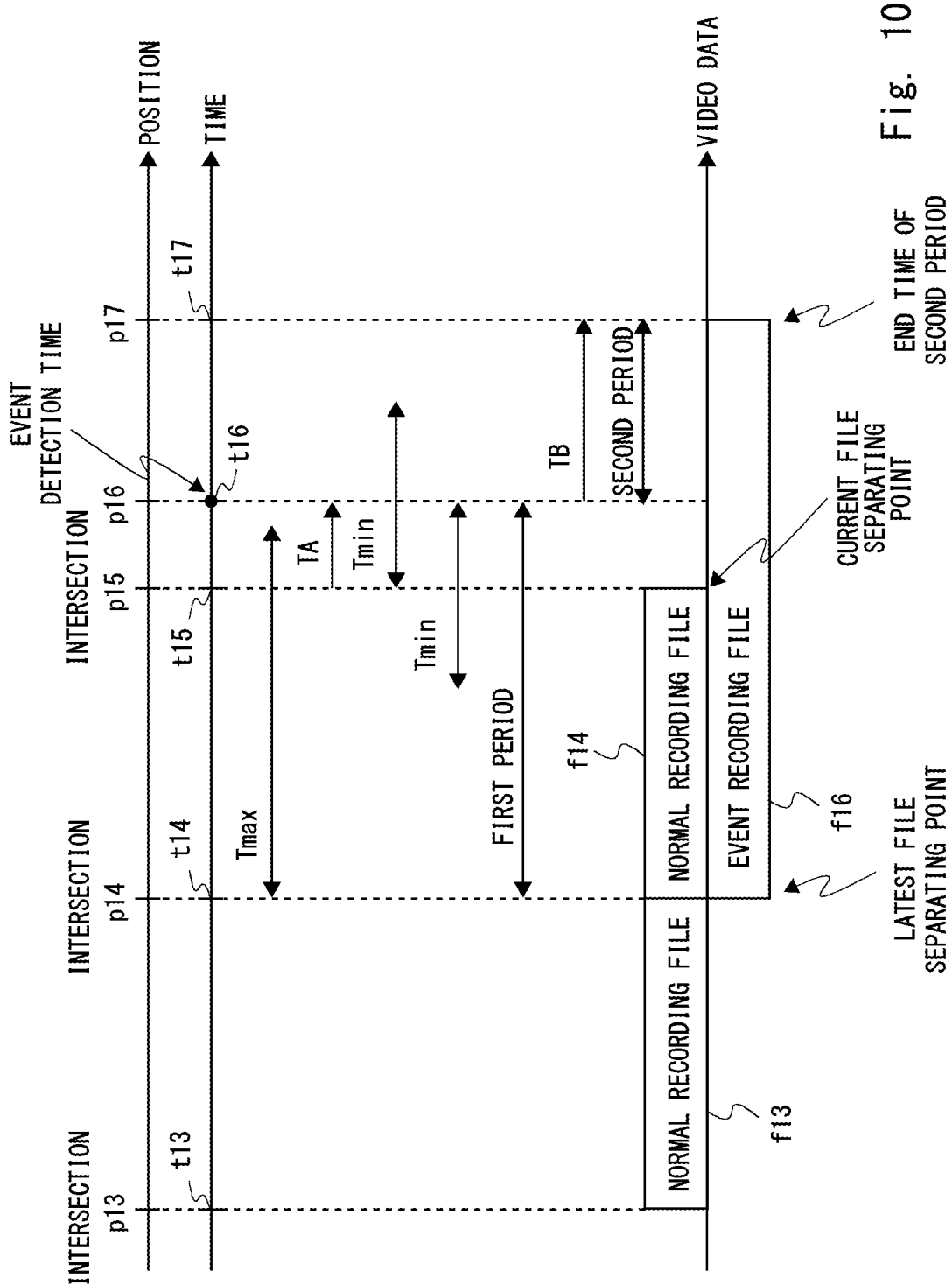
FIG. 10 shows a relation among a position, a time, and a file when generating an event file in which the last intersection is close to an event detection time, according to the first embodiment.

Further, FIG. 10 shows a relation among a position, a time, and a file when generating an event file in which the last intersection is close to an event detection time, according to the first embodiment. FIG. 10 is an example different from those shown in FIG. 9 and the like. For example, the vehicle passes an intersection p14 after passing an intersection p13 and a changing-point passing-state process is performed, so that a normal recording file f13 is generated. After that, the vehicle passes an intersection p15 and a changing-point passing-state process is performed, so that a normal recording file f14 is generated. It is assumed that after that, when the vehicle reaches an event occurrence point p16, an event is detected. At this point, the event detecting-state process in the step S106 is performed. Note that at this point, a time t15 has already been set as the current file separating point.

In the event detecting-state process, the elapsed time TA is a time from the time t15 to the event detection time t16 and hence is shorter than the minimum time Tmin (Yes at S132) in FIG. 10. Therefore, the recording control unit 116 sets a file separating point that is at least the minimum time Tmin before the event detection time and closest to the current time as a start time of the first period (S133). For example, the recording control unit 116 selects file separating points that are at least the minimum time Tmin before the event detection time t16 from among a plurality of past file separating points in the memory. Then, the recording control unit 116 specifies, among the selected past file separating points, a file separating point closest to the event detection time t16 as the last file separating point. In FIG. 10, among the past file separating points including the times t13 and t14, the time t14, which is closest to the event detection time t16, is specified as the last file separating point. Therefore, the time t14 is set as a start time of the first period. At the same time, the recording control unit 116 sets the event detection time t16 as a start time of the second period.

Further, the recording control unit 116 repeats the steps S135 and S136. Then, when the vehicle passes a point p17, it is determined that the elapsed time TB has exceeded the second period (YES at S136). Then, a time t17 is set as an end time of the second period.

Then, the recording control unit 116 generates an event recording file f16 in which the recording range is from the time t14, which is the start time of the first period, to the time t17, which is the end time of the second period (S137), and records the write-protected event recording file f16 in the event recording unit 142. Subsequent steps are similar to those in FIG. 9. Note that the event recording file f16 is an example of an event recording file in which a changing point (the current file separating point) is included in the first period and a start time is a changing point that is at least the minimum time Tmin before the event detecting time point and closest to the current time.

Figure 11:
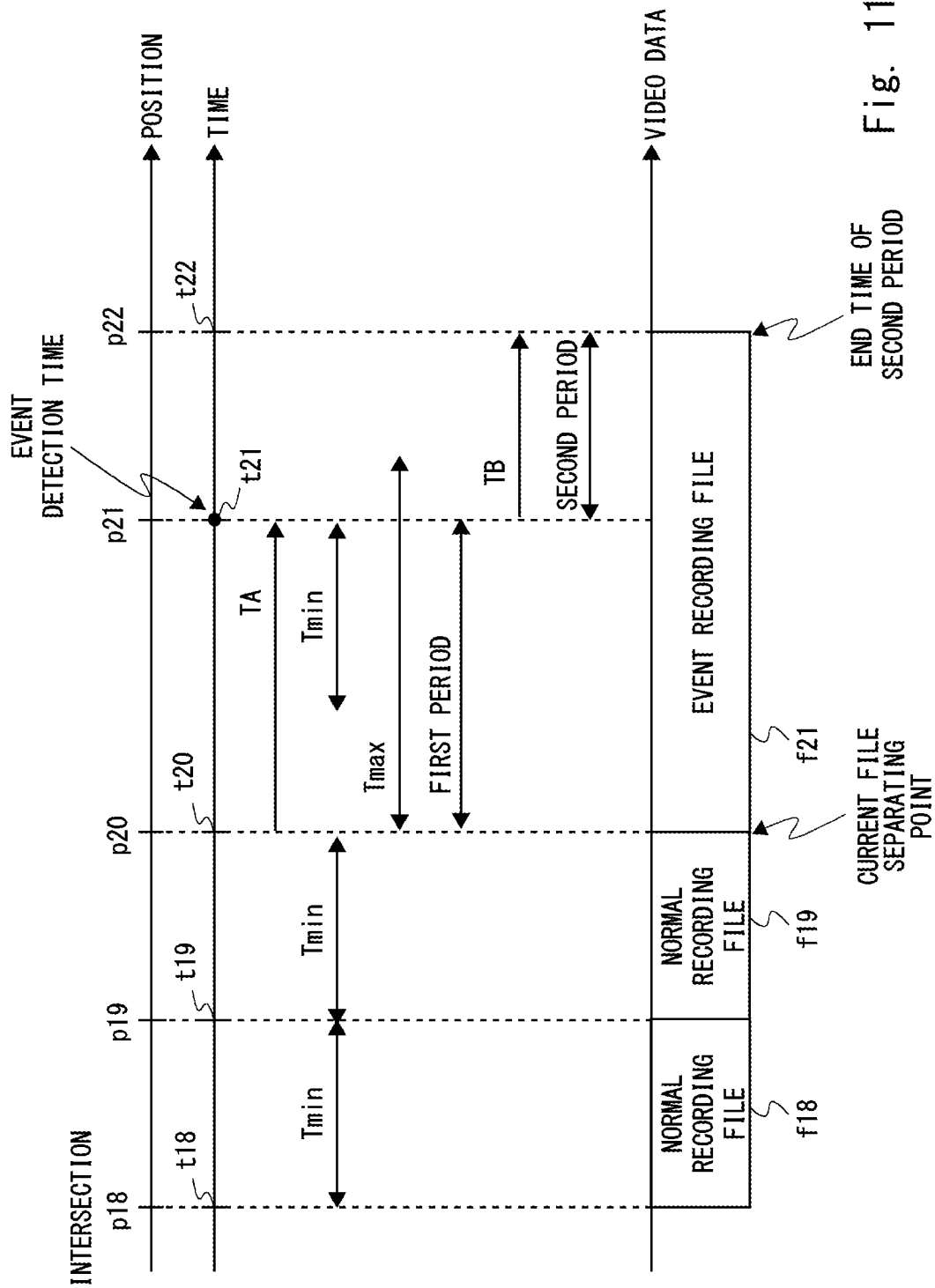
FIG. 11 shows a relation among a position, a time, and a file when generating an event file in which an entity other than the intersection is a start time, according to the first embodiment.

Further, FIG. 11 shows a relation among a position, a time, and a file when generating an event file in which an entity other than the intersection is a start time, according to the first embodiment. FIG. 11 is an example different from those shown in FIG. 10 and the like. For example, after the minimum time Tmin has elapsed after the vehicle passed an intersection p18, the vehicle passes a point p19. Further, after the minimum time Tmin has elapsed, the vehicle passes a point p20 and a normal recording process is performed, so that a normal recording file f18 is generated. After that, a normal recording file f19 is generated in a similar manner. It is assumed that after that, when the vehicle reaches an event occurrence point p21, an event is detected. At this point, the event detecting-state process in the step S106 is performed. Note that at this point, a time t20 has already been set as the current file separating point.

In the event detecting-state process, since the elapsed time TA is a time from the time t20 to the event detection time t21 in FIG. 11, it is equal to or longer than the minimum time Tmin (No at S132). Further, the recording control unit 116 sets the time t20, which is the current file separating point, as a start time of the first period (S134). At the same time, the recording control unit 116 sets the event detection time t21 as a start time of the second period. That is, the difference from FIG. 9 is that the start time of the first period is not a changing point such as an intersection, but is a point at the time t20 at which the vehicle passes the point p20. Subsequent steps are similar to those in FIG. 9. That is, the vehicle passes the point p22 and the elapsed time TB exceeds the second period, so that a write-protected event recording file f21 from the time t20 to the time t22 is recorded. Note that the event recording file f21 is an example of an event recording file in which a start time is a point other than the changing point.

Figure 12:
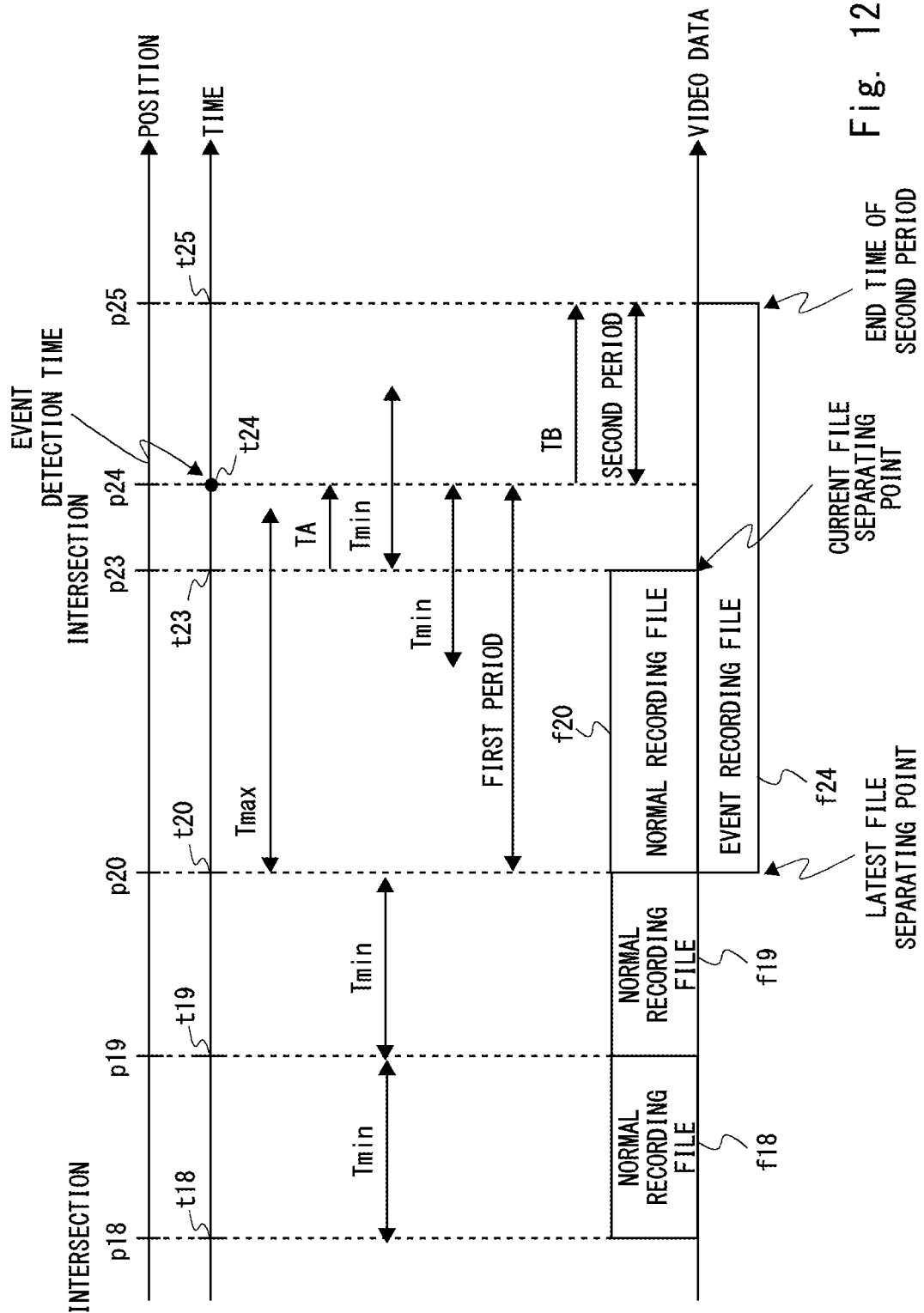
FIG. 12 shows a relation among a position, a time, and a file when generating an event file in which the last intersection is close to an event detection time and an entity other than the intersection is a start time, according to the first embodiment.

Further, FIG. 12 shows a relation among a position, a time, and a file when generating an event file in which the last intersection is close to an event detection time and an entity other than the intersection is a start time, according to the first embodiment. FIG. 12 is an example different from those shown in FIG. 11 and the like, in which before the detection of the event shown in FIG. 11, the vehicle passes an intersection p23 and a changing-point passing-state process is performed, so that a normal recording file f20 is generated. After that, in this example case, the vehicle reaches an event occurrence point p24 within the minimum time Tmin after the vehicle passed the intersection p23, and an event is detected. At this point, the event detecting-state process in the step S106 is performed. Note that at this point, a time t23 has already been set as the current file separating point.

In the event detecting-state process, since the elapsed time TA is a time from the time t23 to the event detection time t24 in FIG. 12, it shorter than the minimum time Tmin (Yes at S132). Further, the recording control unit 116 sets the time t20, which is a file separating point that is at least the minimum time Tmin before the event detection time t24 and closest to the current time, as a start time of the first period (S133). That is, the difference from FIG. 10 is that the start time of the first period is not a changing point such as an intersection, but is a point at the time t20 at which the vehicle passes the point p20. Subsequent steps are similar to those in FIG. 10. That is, the vehicle passes the point p25 and the elapsed time TB exceeds the second period, so that a write-protected event recording file f24 from the time t20 to the time t25 is recorded. Note that the event recording file f24 is an example of an event recording file in which a changing point is included in the first period, and the start time is a point other than the changing point and at least the minimum time Tmin before the event detection time.

Further, this embodiment can also be understood as follows. While no occurrence of an event is detected, the recording control apparatus 110 determines a file separating point according to a result of a determination as to a passage of a changing point. For example, while the vehicle has passed no changing point, the recording control apparatus 110 determines, after the minimum time Tmin has elapsed from the current file separating point, a time that is at least the minimum time Tmin after the current file separating point as the next file separating point. Then, when at least the maximum time Tmax has elapsed from the current file separating point, the recording control apparatus 110 records video data between the current and next file separating points that are consecutive in terms of the time as a write-permitted normal recording file. Further, when the vehicle passes a changing point, the recording control apparatus 110 determines the current time as the next file separating point and records video data from the current file separating point to the next file separating point, which is the current time, as a write-permitted normal recording file. Further, the recording control apparatus 110 stores at least one history of the file separating point.

Further, when an event is detected, the recording control unit 110 defines the last file separating point as a start time, defines a time that is a predetermined period after the event detecting time point as an end time, and records video data between the start time and the end time as a write-protected event recording file. However, in the case where an event is detected within a short period, i.e., within the minimum time Tmin after the passage of an intersection, if the passing time point of the intersection, the current file separating point is used as the start time, there is a possibility that the cause of an accident or the like may not be recorded. Therefore, when an event is detected, it is necessary to specify a file separating point that is at least the minimum time Tmin before the detecting time point of the event. Accordingly, when an event is detected and the current file separating point is within the minimum time Tmin from the current time, the above-described history of the file separating point is referred to. By doing so, it is possible to specify the last file separating point among file separating points that are at least the minimum time Tmin before the detecting time point of the event.

As described above, by separating files with consideration given to passages of intersections during normal traveling in which no occurrence of an event is detected, it is possible to easily adjust the recording range to an appropriate range by using file separating points even when an event is detected.

Second Embodiment

Figure 13:
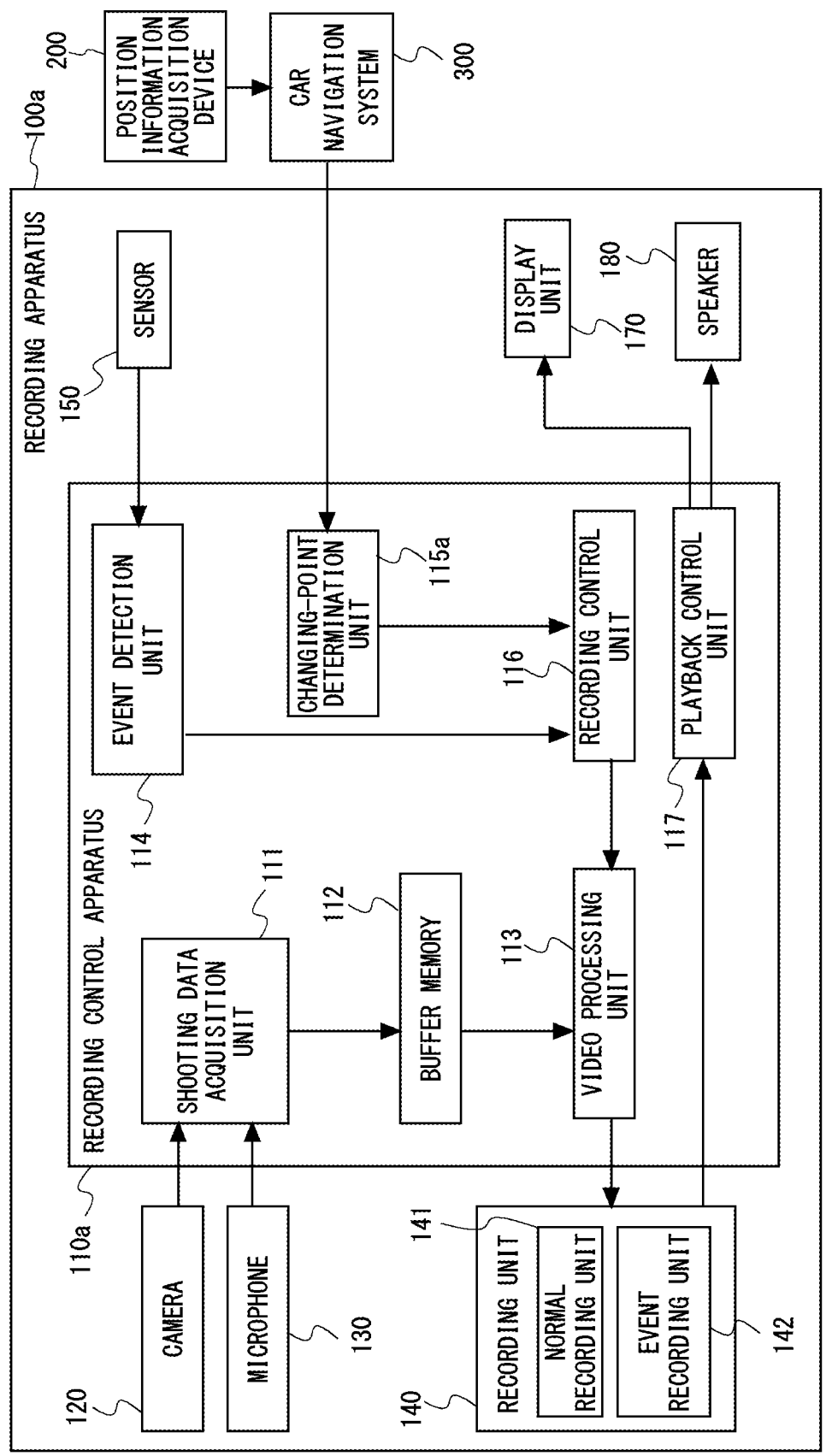
FIG. 13 is a block diagram showing an overall configuration of a recording apparatus including a recording control apparatus according to a second embodiment.

A second embodiment is a modified example of the first embodiment. FIG. 13 is a block diagram showing an overall configuration of a recording apparatus 100a including a recording control apparatus 110a according to the second embodiment. In FIG. 13, a changing point is detected in a car navigation system 300. Further, the car navigation system 300 holds map information 161 therein and acquires current position information of the vehicle from a position information acquisition device 200. The car navigation system 300 compares the current position information with the map information 161 and thereby determines whether or not the current position information corresponds to a position of a changing point on the traveling load defined in the map information 161. Then, the car navigation system 300 outputs a notification signal indicating a result of the determination to the recording apparatus 100a.

The recording apparatus 100a differs from the above-described recording apparatus 100 because the recording apparatus 100a does not require the map information 161 and the recording control unit 110 is changed to the recording control unit 110a. In the recording control apparatus 110a, the changing-point determination unit 115 is changed to a determination unit 115a. In response to the notification signal from the car navigation system 300, the determination unit 115a outputs a changing-point passage determination signal indicating a result of the determination as to whether or not the vehicle has passed a changing point on the traveling load to recording control unit 116. For example, when the notification signal first indicates that the current position information of the vehicle matches a changing point and then indicates that the current position information does not match the changing point, the determination unit 115a outputs a changing-point passage determination signal indicating that the vehicle has passed the changing point on the traveling load.

As described above, the second embodiment can also achieve advantageous effects similar to those in the above-described first embodiment.

Other Embodiments

The present disclosure has been explained above with the above-described embodiments. However, the present disclosure is not limited to the configurations of the above-described embodiments, and needless to say, various modifications, corrections, and combinations that can be made by those skilled in the art are also included in the scope of the disclosure specified in the claims of the present application.

In the above-described embodiment, the changing-point determination unit 115 determines whether or not the vehicle has passed a changing point on the road such as an intersection based on the current position information of the vehicle and the map information. However, the determination of a changing point on the road by the changing-point determination unit 115 is not limited to this example. For example, steering information of the vehicle may be acquired through a CAN or the like. Then, when the steering angle becomes equal to or larger than a predetermined angle, it may be determined as a changing point on the road. Further, it may be determined as a changing point on the road when the steering has a predetermined steering angle or larger and the traveling direction of the vehicle has changed based on the steering information and the current position information of the vehicle. Further, blinker information of the vehicle may be acquired through a CAN or the like and a changing point may be determined based on a combination of various information items, such as when a blinker is operated and the steering has a predetermined steering angle or when a blinker is operated and the traveling direction of the vehicle has changed.

Further, any of the processes in the above-described recording control apparatuses can also be implemented by causing a CPU (Central Processing Unit) to execute a computer program. In such cases, the computer program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, in addition to the cases where the functions of the above-described embodiment are implemented by causing a compute to execute a program that is used to implement functions of the above-described embodiment, other cases where the functions of the above-described embodiment are implemented with cooperation with an OS (Operating System) or application software running on the computer are also included in the embodiment of the present disclosure. Further, other cases where all or part of the processes of this program are executed by a function enhancement board inserted into the computer or a function enhancement unit connected to the compute to implement the functions of the above-described embodiment are also included in the embodiment of the present disclosure.

According to the embodiment, it is possible to provide a recording control apparatus, a recording apparatus, a recording control method, and a recording control program capable of appropriately recording an event that has triggered a traffic accident or the like.

The present disclosure can be applied to a dashboard camera, a recording control apparatus, and a recording apparatus that are mounted on a moving object including a vehicle equipped with a camera or the like, and have industrial applicability.

What is claimed is:

1. A recording control apparatus comprising:
at least one memory storing a program; and
at least one processor coupled to the at least one memory, the at least on processor configured to execute the program to:
    acquire video data obtained by shooting an area around a vehicle;
    detect an event based on an acceleration of the vehicle;
    to determine whether or not the vehicle has passed a changing point on a traveling road based on a current position information of the vehicle; and
    when the occurrence of the event is detected, record the video data including a first period as an event recording file in a recording memory, the first period being from a passing time point of the changing point to a detecting time point of the event, the changing point being a point that the vehicle has passed at least a first time earlier than the detecting time point of the event, and
    wherein the at least one processor is further configured to define the passing time point of the changing point as a start time of the first period, the changing point being a point that the vehicle has last passed among changing points that the vehicle has passed at least the first time earlier than the detecting time point of the event.

2. The recording control apparatus according to claim 1, wherein when the first period is equal to or longer than a second time and earlier than the detecting time point of the event, the at least one processor is further configured to define a time point that goes back a time no shorter than the first time and shorter than the second time from the detecting time point of the event as a start time of the first period, the second time being longer than the first time.

3. The recording control apparatus according to claim 1, wherein the at least one processor is further configured to, when the occurrence of the event is detected, record the video data including a second period from the detecting time point of the event until a predetermined time elapses in addition to the first period as the event recording file in the recording memory.

4. The recording control apparatus according to claim 1, wherein the at least one processor is further configured to:
    determine, every time the vehicle passes a changing point, a boundary time so that a recording range of the video data is equal to or longer than the first time, the boundary time being used as a boundary of the video data; and
    record, when no occurrence of an event is detected within a third time longer than the first time, the video data between the last two consecutive boundary times as a normal recording file.

5. The recording control apparatus according to claim 4, wherein the at least one processor is further configured to record the event recording file as a write-protected file in the recording memory and records the normal recording file as a write-permitted file in the recording memory.

6. The recording control apparatus according to claim 1, wherein the changing point is an intersection on the traveling road.

7. A recording apparatus comprising:

the recording control apparatus according to claim 1;

a camera configured to shoot an area around a vehicle;

a recording memory configured to record the video data, the video data recorded to the recording memory by the at least one processor of the recording control apparatus.

8. A recording control method comprising:

a step of acquiring video data obtained by shooting an area around a vehicle;

a step of detecting an event based on an acceleration of the vehicle;

a step of determining whether or not the vehicle has passed a changing point on a traveling road based on a current position information of the vehicle; and a step of, when the occurrence of the event is detected, recording the video data including a first period as an event recording file in a recording unit, the first period being from a passing time point of the changing point to a detecting time point of the event, the changing point being a point that the vehicle has passed at least a first time earlier than the detecting time point of the event, the first period being defined as the passing time point of the changing point as a start time of the first period, the changing point being a point that the vehicle has last passed among changing points that the vehicle has passed at least the first time earlier than the detecting time point of the event.

9. A non-transitory computer readable medium storing a recording control program for causing a computer to perform:

a step of acquiring video data obtained by shooting an area around a vehicle;

a step of detecting an event based on an acceleration of the vehicle;

a step of determining whether or not the vehicle has passed a changing point on a traveling road based on a current position information of the vehicle; and a step of, when the occurrence of the event is detected, recording the video data including a first period as an event recording file in a recording unit, the first period being from a passing time point of the changing point to a detecting time point of the event, the changing point being a point that the vehicle has passed at least a first time earlier than the detecting time point of the event, the first period being defined as the passing time point of the changing point as a start time of the first period, the changing point being a point that the vehicle has last passed among changing points that the vehicle has passed at least the first time earlier than the detecting time point of the event.

* * * * *